United States Patent [19]

Brodeur

[11] Patent Number: 4,631,543

[45] Date of Patent: Dec. 23, 1986

[54] METHOD AND APPARATUS FOR REDUCING THE EFFECTS OF IMPULSE NOISE IN LORAN-C RECEIVERS

[75] Inventor: Lester R. Brodeur, Nashua, N.H.

[73] Assignee: Sanders Associates, Inc., Nashua, N.H.

[21] Appl. No.: 536,479

[22] Filed: Sep. 28, 1983

[51] Int. Cl.⁴ .............................................. G01S 1/24
[52] U.S. Cl. ................................... 342/389; 342/390
[58] Field of Search ............................. 343/389, 390

[56] References Cited

U.S. PATENT DOCUMENTS

| | | | |
|---|---|---|---|
| 3,858,216 | 12/1974 | DeVaul | 343/389 |
| 4,195,299 | 3/1980 | Van Etten | 343/389 |
| 4,214,245 | 7/1980 | Fujino et al. | 343/389 |
| 4,318,105 | 3/1982 | Brodeur | 343/389 |
| 4,325,067 | 4/1982 | Brodeur | 343/389 |
| 4,392,138 | 7/1983 | Jasper et al. | 343/389 |
| 4,416,017 | 11/1983 | Jasper et al. | 343/389 X |
| 4,445,223 | 4/1984 | Jasper et al. | 343/389 X |
| 4,468,668 | 8/1984 | Brodeur | 343/389 |

Primary Examiner—Theodore M. Blum
Assistant Examiner—John B. Sotomayor
Attorney, Agent, or Firm—Louis Etlinger; Wm. F. Porter, Jr.

[57] ABSTRACT

The effects of impulse noise on the operation of a microprocessor-controlled Loran-C receiver are reduced by muting or attenuating the received signals in the front end of the receiver ahead of the receiver gain during a time period which preceeds the start time of the pulses being tracked. The attenuation is selectively removed after the start time of each pulse being tracked to permit the receiver to perform its time difference of pulse arrival measurements in the normal manner. The attenuation is also selectively removed during those time periods in which the receiver performs its envelope slope, skywave/groundwave and other such samplings. The attenuation is provided by a muting circuit which is controlled by a time gate signal that derives from the microprocessor of the receiver.

15 Claims, 7 Drawing Figures

METHOD AND APPARATUS FOR REDUCING THE EFFECTS OF IMPULSE NOISE IN LORAN-C RECEIVERS

FIELD OF THE INVENTION

This invention relates to navigational equipment and, more particularly, to a method and apparatus for reducing the effects of impulse noise in long range hyberbolic navigational equipment of the type that determines position by measuring the time difference in the arrival of radio frequency pulses from synchronized ground transmitting stations.

BACKGROUND OF THE INVENTION

Standard Loran, or long range, navigational systems consist of a series of radio frequency transmitter stations spaced apart from one another at fixed ground locations. These systems are used in navigation to determine position by measuring the time difference in the arrival of synchronized, radio frequency pulses transmitted from the transmitter stations in a given Loran series or chain.

The most commonly employed Loran navigational system in use at the present time is called Loran-C. Developed during World War II for military use, Loran-C has been used commercially since the mid-1970's, and overcomes many of the shortcomings of earlier long range navigational systems.

Loran-C is a pulsed, low-frequency (100 kilohertz) hyberbolic radio navigational system. Each Loran-C chain consists of three or more synchronized ground stations, each of which transmits radio pulse trains having, at their respective starts of transmission, a fixed time relation to each other. The first station to transmit in a given Loran-C chain is referred to as the master station, while the other stations in the chain are referred to as the secondary stations. The pulse trains are received by receiving equipment that is generally located on board a ship or aircraft whose position is to be accurately determined.

The pulse trains transmitted by each of the master and secondary stations consist of a fixed number of phase coded pulses and are repeated at a constant precise repetition rate. Each pulse in the pulse train has an exact envelope shape and is separated in time from a prior pulse in the same train by a precise fixed time interval (i.e., 1000 microseconds). In addition, the secondary pulse train transmissions are delayed a sufficient amount of time after the master station pulse train transmissions to assure that the secondary pulses are received after the master pulses regardless of the location of the receiving equipment within the coverage area of the particular Loran-C chain. Since the transmissions from the master and secondary stations are in the form of pulses of radio frequency electromagnetic energy which propagate at a constant velocity, the difference in the time of arrival of pulses from a master and a secondary station represents the difference in the length of the transmission paths from these stations to the Loran-C receiving equipment.

The locus of all points on a hydrographic chart corresponding to a constant difference in distance from a master station and a given secondary station, and thus to a fixed time difference of arrival of their respective pulse trains, defines a hyperbola. Loran-C hydrographic charts are available from the National Oceanagraphic and Atmospheric Administration (NOAA) and the U.S. Defense Mapping Agency which are printed with hyperbolic curves marked with time difference of arrival information for the master and each secondary station associated with the particular geographical area covered by the chart. By measuring the time difference of arrival of pulses from the master station and each of two or more secondary stations in a given Loran-C chain, two or more corresponding hyperbolae can be located on such a chart, and their point of intersection accurately identifies the position of the Loran-C receiver. As a result of the use of a moderately low frequency, such as 100 kilohertz, which is characterized by low attenuation, and of extremely precise pulse shaping, timing and synchronization procedures at the transmitter stations, the modern-day Loran-C system is capable of providing equipment position location accuracies within about two hundred feet, and a repeatability within about fifty feet.

Those desiring a more detailed description of the theory and operation of the Loran-C radio navigational system are referred to an article by W. P. Frentz, W. Dean and R. L. Frank entitled "A Precision Multi-Purpose Radion Navigation System", 1957 I.R.E. Convention Record, Part 8, page 79, and to a pamphlet distributed by the Department of Transportation, U.S. Coast Guard, Number CG-462, dated Aug., 1974, entitled "Loran-C User Handbook".

To make the precise time difference of pulse arrival measurements required for the Loran-C positional accuracy, the zero crossing of a specific (usually the third) carrier frequency cycle of each pulse must be identified. These zero crossings are used as tracking points in each pulse to make the time difference of pulse arrival measurements in a well known manner. In theory this will work, but in actual practice, noise and spurious signals at and about the same frequency as the carrier frequency of the Loran-C pulses make the task very difficult. The strength of the received pulses very often is weak and, when weak signals are combined with received noise within the passband of the Loran-C receiver, very low signal-to-noise ratios result. Thus, identification of the desired tracking point of each pulse becomes very difficult and many times impossible utilizing prior receiving equipment. In addition, received noise can distort the envelope of the received pulses and cause erroneous identification of the desired tracking point of the pulse. These problems can in turn result in faulty time difference of pulse arrival measurements, and substantially degrade the accuracy and reliability of the Loran-C equipment positional determinations.

U.S. Pat. No. 4,318,105, which is assigned to the same assignee as the present application, discloses improved Loran-C receiving equipment which provides considerably faster response and measurement times than prior receiving equipment, particularly in extremely low signal-to-noise environments. The receiver disclosed in that patent utilizes a unique digital circuit arrangement and an embedded microprocessor to automatically identify pulses from Loran transmitting stations and make standard hyperbolic navigational measurements.

Briefly, the receiver disclosed in U.S. Pat. No. 4,318,105 operates initially in a so-called "acquisition" mode in which it receives all signals that appear within a small bandwidth centered upon the 100 kilohertz operating frequency of the Loran-C network. In the acquisition mode, the receiver generally locates the pulse trains from the master and secondary stations in a selected Loran-C chain. This is accomplished by coupling the received signals as they are received serially through the time-delaying stages of a multi-stage digital shift register, the outputs of which are in turn coupled to logic circuitry. The shift register and logic circuitry continuously check the received signals to search for the existence of pulse trains having the unique number of pulses, pulse time spacing and phase of those which are transmitted by the master and secondary stations in the selected chain. The embedded microprocessor analyzes the outputs from the shift register and logic circuitry to determine when signals from the master and secondary stations in the selected chain are being regularly and reliably received. Once this determination is made, the microprocessor switches the receiver into a so-called "settling" mode.

In the settling mode, the microprocessor and associated circuitry in the receiver identify the desired tracking point (e.g., the third cycle zero crossing) of each received pulse. In the event that the tracking point of a pulse is not identified at the approximate time indicated by the microprocessor, the analyzation circuitry indicates to the microprocessor whether to add or subtract an increment of time to the approximate time of arrival and then repeats the analyzation procedure. This analyzation procedure and shifting of the approximate search point is repeated automatically until the desired tracking point of the received pulses from each of the master and secondary stations in the selected chain is accurately identified.

Once the desired tracking point is so identified, the microprocessor switches the receiver into a so-called "tracking" mode. In the tracking mode, the receiver continuously tracks the identified tracking points of the received pulses and makes a plurality of time difference of arrival measurements between the pulses from the master and secondary stations of the selected chain using a crystal controlled clock internal to the receiver. The microprocessor then averages these measurements and provides appropriate outputs corresponding to the averages to a visual output display.

U.S. Pat. No. 4,325,067, which is also assigned to the same assignee as the present application, discloses further improvements in microprocessor-controlled Loran-C receiving equipment. The equipment disclosed in the latter patent operates essentially in the same manner as that disclosed in the former patent in terms of its acquisition, settling and tracking functions. In addition, it includes certain additional circuitry which makes it more effective in reducing the effects of noise and spurious signals on the operation and accuracy of the receiver.

More specifically, the receiver disclosed in U.S. Pat. No. 4,325,067 includes circuitry for periodically inverting or shifting the phase of the received signals by 180° at the front end of the receiver immediately after its receiving antenna. These periodic phase reversals cause noise generated internally of the receiver to average out, so that the noise does not introduce a bias level to the received signals which can result in erroneous time difference of signal arrival measurements. The periodic phase reversals are later removed or compensated for downstream of the receiving antenna in the receiver signal path before the time period of the 180° phase shift can interfere with the time difference of signal arrival measurements made by the receiver.

The receiver disclosed in U.S. Pat. No. 4,325,067 also performs various noise checking routines during its settling and tracking modes. In one such routine which is operative during the settling and tracking mode, the receiver, through appropriate time gating with its microprocessor, generates a pair of search windows, with one such window on each side of the expected time of arrival of the tracking point of each pulse being tracked. The envelope slope of the signals in each search window are sampled by the receiver, and the microprocessor develops histograms for a large number of such samples. The histograms are analyzed by the microprocessor to decide if the calculated time of arrival of the tracking point and time position of the search windows should be shifted or revised. The histograms enable the microprocessor to reduce, statistically, the effects of external noise and spurious signals that occur within the search windows. Thus, the desired tracking point of each Loran-C pulse is easier to track, and time difference of arrival measurements are made more accurately, even in noisy signal environments where the signal-to-noise ratios are extremely low.

The receiver disclosed in U.S. Pat. No. 4,325,067 also includes circuitry for avoiding the effects of skywave interference. Skywaves are echoes of the transmitted Loran-C groundwave pulses which are reflected back to earth from the ionosphere. Because of their longer transmission paths, skywaves arrive at a given point after their corresponding groundwaves. The delay may be such that the skywave overlaps either its own corresponding groundwave or the groundwave of a succeeding pulse upon receipt at a Loran-C receiver. In either case, the received skywave can interfere with a groundwave being tracked, and this interference can in turn result in positional errors.

The circuitry disclosed in U.S. Pat. No. 4,325,067 for avoiding skywave interference operates again in the settling and tracking modes of the receiver, and again through appropriate time gating with the microprocessor. The circuitry samples the received signals at several fixed times prior to the expected time of arrival of the tracking point of each pulse being tracked. If the microprocessor determines from these samples that there is an earlier signal having the same repetition rate as the signal being tracked, it modifies its calculated time of arrival and the procedures are repeated. This continues until no signal having the same repetition rate is detected from the sampling, thus confirming that the receiver is properly locked onto the groundwave.

Receivers embodied in accordance with the teachings of the above patents have marked advantages over prior receivers in terms of their ability to acquire, settle and track Loran-C signals accurately and reliably in the presence of both internal and external noise. However, such receivers, like prior receivers, are still susceptible to interference from so-called impulse noise. Impulse noise, as the words imply, consists of fast acting power surges or transients which typically result from sources external to the receiver such as lightning, spark plug ignition or the like. The front end circuitry of a Loran-C receiver is characterized by a relatively high Q factor due to its narrow bandwidth and permanent tuning to the Loran-C operating frequency of 100 kilohertz. This circuitry is thus readily excited by impulses. An impulse may occur in time coincidence with the earlier portion of a Loran-C pulse being tracked by the receiver, but the more probable and troublesome interference situation is one in which the impulse arrives ahead of the pulse being tracked. In the latter situation, the impulse causes front end ringing or energy storage at the Loran- C operating frequency which artificially stretches in time so as to give the appearance of a valid Loran-C pulse. This ringing often results in an erroneous identification of the tracking point, and makes it difficult to track that point due to the effective reduction in signal-to-noise ratio which results from the stored impulse energy. Given the typical time constants of Loran-C receiver front ends, impulses which arrive anywhere up to several hundred microseconds ahead of the tracking point can cause these problems.

Notwithstanding the significant advances that have been made in recent years in Loran-C receiver noise reduction, impulse noise remains as one of the primary, accuracy degrading interference mechanisms in Loran-C systems today. Thus, there exists a real need in the art for improved circuitry and techniques to minimize the effects of impulse noise in Loran-C and related systems.

SUMMARY OF THE INVENTION

The foregoing need in the art is satisfied by the inclusion of circuitry in the front end of a tuned signal receiver which can be activated to mute or attenuate the received signals ahead of the initial gain and energy storage stage of the receiver during those time periods of impulse noise vulnerability.

In the illustrative embodiments of the invention which are described in detail hereinafter, a muting circuit in accordance with the invention is used in conjunction with Loran-C receivers of the type disclosed in U.S. Pat. Nos. 4,318,105 and 4,325,067. The muting circuit is connected between the output of the receiving antenna and input to the filter and preamplifier stage of the receiver. It is controlled by time gate signal which derives from the embedded microprocessor in the receiver.

More specifically, the muting circuit is operative after the acquisition mode of the receiver. Thus, it is assumed that the receiver has acquired the desired Loran-C pulse trains, and that it is either cycle correcting or has settled and is tracking a known zero crossing. In these two modes, the microprocessor knows the start time $T_o$ of the Loran-C pulse being analyzed or tracked. The microprocessor can thus be programmed to generate a time gate signal which preceeds the start time $T_o$ of the pulse being tracked, and which is sufficiently long to allow the information portion of the expected Loran-C pulse to be received independently of energy storage from prior impulse noise events. This time gate signal is used to activate the muting circuit to attenuate any signals received by the receiver front end during the pre-pulse sensitivity period, and to deactivate the muting circuit during those time periods during which the envelope slope samplings, skywave/groundwave samplings, and tracking point detections are performed, so that the latter functions may proceed as usual. Such muting during during the pre-pulse sensitivity period helps prevent impulses from artifically exciting the receiver front end, and subsequently interfering, by energy stretching, with the time difference of arrival measurements made by the receiver.

In an alternative embodiment of the invention, the muting circuit is placed in a feedback loop between the output of the receiver's filter/preamplifier stage and the input to that stage. The time gate signal from the microprocessor is then used to cause the muting circuit to feedback the inverted output of the filter/preamplifier stage to its input, and thereby to greatly attenuate the input, during the pre-pulse sensitivity period. At the start time $T_o$ of the tracking pulse, the negative feedback is discontinued so that the tracking and time difference of arrival measurements may proceed as usual. This feedback arrangement avoids the effects of switching transients in the muting circuit which themselves can cause impulse excitation when the switching is done upstream of the receiver's filter/preamplifier stage.

BRIEF DESCRIPTION OF THE DRAWINGS

The foregoing and other objects, features and advantages of the invention will be better understood upon review of the following detailed description taken in conjunction with the drawing in which.

DETAILED DESCRIPTION OF THE PREFERRED EMBODIMENTS

As previously noted, the muting circuit and technique of the present invention may advantageously be used with the Loran-C receivers disclosed in U.S. Pat. Nos. 4,318,105 and 4,325,067. Thus, they will be described hereinafter specifically in that context, and the disclosures of U.S. Pat. Nos. 4,318,105 and 4,325,067 are expressly incorporated herein by reference.

Figure 1:
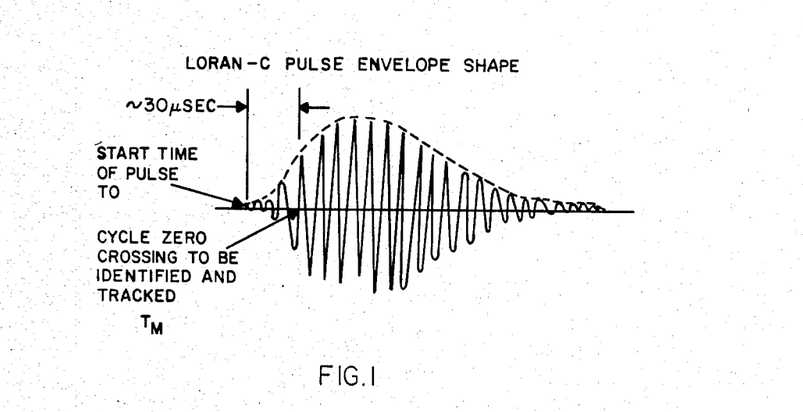
FIG. 1 illustrates the waveform shape of each pulse in the pulse trains transmitted by Loran-C master and secondary stations.

FIG. 1 illustrates the shape of the waveform of each pulse in the pulse trains transmitted by both master and secondary Loran-C stations. As indicated in the above-cited patents, the waveform of each such pulse is very carefully controlled to aid in the identification and tracking of the third carrier cycle zero crossing which is used by the receiver's microprocessor as the tracking point for making accurate time difference of arrival measurements. As shown in FIG. 1, and as is well known in the Loran-C art, the third cycle zero crossing occurs at a time period $T_m$ that is approximately 30 microseconds after the start time $T_o$ of the pulse.

After the receivers disclosed in the above-cited patents roughly acquire the pulse train transmissions from the master and secondary stations of a given Loran-C chain, they enter their settling mode by locking on to what is assumed to be the desired tracking point (i.e., the third cycle zero crossing) of each pulse being received. In the settling mode, the receivers continuously analyze the envelope slope of the pulse at the assumed tracking point to determine if the assumed tracking point is in fact the desired third cycle zero crossing. Once it is confirmed that the desired tracking point has been located, the receivers enter their tracking mode. In the tracking mode, the envelope slope analysis is continued so as to maintain the lock on the desired tracking point, while a plurality of time difference of arrival measurements are made, which are later averaged to provide the time difference of arrival measurements that are outputed by the receiver. During both the settling and tracking modes, the embedded microprocessor in each receiver knows the time $T_m$ of the tracking point zero crossing of each pulse being tracked, as well as the start time $T_o$ of each such pulse. This information is used in the generation of a suitable time gate signal which in turn is used to control a muting circuit in accordance with the present invention, as will be described in detail presently.

As mentioned earlier, the receiver disclosed in U.S. Pat. No. 4,325,067, generates various time gate signals during its settling and tracking modes. One such time gate signal is used to establish a pair of search windows, each of a 2.5 microsecond duration, with one such window on each side of a time that corresponds to the tracking point zero crossing of each pulse being tracked. The receiver's microprocessor histographically samples the signals within each of these search windows, and uses this sampling to reduce, statistically, the effects of noise and spurious signals on the envelope slope analyses it performs to determine or confirm that the tracking point on which it is locked is in fact the desired third cycle zero crossing.

Another time gate signal which is generated by the receiver disclosed in U.S. Pat. No. 4,325,067 is used to take samples of the received signals at certain fixed times prior to the tracking point of each pulse being tracked as a skywave/groundwave check. These samples are taken, respectively, at 65.0 microseconds, 58.8 microseconds and 52.5 microseconds prior to the time $T_m$ of the tracking point zero crossing. The absence of signals in these samples having the same repetition rate as the signal being tracked confirms that the receiver is properly locked on to a groundwave.

Preferably, the time gate signal that is generated to control tne muting circuit of the present invention is such that it does not prevent or otherwise interfere with the performance of these envelope slope and skywave/groundwave samplings performed by the receiver.

Figure 2:
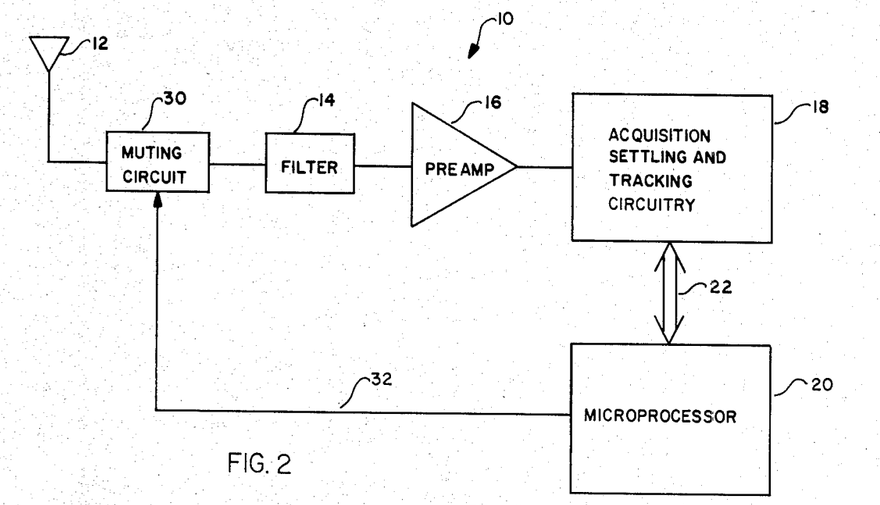
FIG. 2 is a block diagram of a Loran-C receiver which incorporates a muting circuit in accordance with a first embodiment of the invention.

Referring now to FIG. 2, there is shown a block diagram of a first embodiment of the invention. Shown there is a Loran-C receiver 10 which includes a receiving antenna 12, filter 14, preamplifier 16, acquisition, settling and tracking circuitry 18, and a microprocessor 20 for controlling the operation of the acquisition, settling and tracking circuitry 18. Receiving antenna 12 is of conventional design optimized for receiving radio frequency pulses at the Loran-C operating frequency of 100 kilohertz. Filter 14 has a 20 kilohertz bandwidth centered on the 100 kilohertz operating frequency with a sharp drop off at each side of its passband. Preamplifier 16 is tuned to the 100 kilohertz operating frequency and provides initial signal gain and energy storage for the receiver 10 in a well known manner. The acquisition, settling and tracking circuitry 18 and microprocessor 20 are illustratively of the design disclosed in detail in U.S. Pat. No. 4,325,067. A detailed source program listing illustrating the operation of the microprocessor 20 for such a receiver is set forth in that patent. Control signals, including the aforementioned envelope slope and skywave/groundwave sampling time gate signals, are coupled between the microprocessor 20 and the acquisition, settling and tracking circuitry 18 by a multiple line conductor 22.

As noted, the front end circuitry of the Loran-C receiver 10, comprising its receiving antenna 12, filter 14 and preamplifier 16, is extremely sensitive to impulse noise due to its relatively high Q factor, i.e., narrow bandwidth and fixed tuning. Impulses can thus readily excite this circuitry, causing it to ring at its tuned frequency of 100 kilohertz. The effect of this ringing is to generate an oscillatory signal which initially rises and then decays, and which stretches in time to appear very much like the Loran-C pulse waveform shown in FIG. 1. If the impulse arrives ahead of a Loran-C pulse which is being tracked by the receiver 10, it can be mistakenly identified by the receiver as a validly received Loran-C pulse. Additionally, it can interfere with the Loran-C pulse actually being tracked by the receiver, causing distortion or lose of the tracking point. Given the typical time constants of Loran-C receiver front end circuitry, this ringing can persist for up to about 350 microseconds. Thus, impulses which arrive anywhere up to about 350 microseconds ahead of the pulse being tracked can give rise to interference and degrade the accuracy and response time of the receiver 10.

As shown in FIG. 2, the effect of impulses on the front end circuitry of the receiver 10 is reduced by incorporating a muting circuit 30 ahead of the initial gain and energy storage stage of the receiver, i.e., ahead of the filter 14 and preamplifier 16. In the particular embodiment of FIG. 2, the muting circuit 30 is positioned between the receiving antenna 12 and the filter 14. The muting circuit 30 operates to mute or attenuate the signals that are coupled to the filter 14 and preamplifier 16 during a time period that preceeds the arrival of the Loran-C pulse being tracked. Preferably, this muting time period is selected to be of sufficient duration to cover the impulse sensitivity period which preceeds the start time $T_o$ of the pulse being tracked by at least about 350 microseconds. The muting is preferably discontinued during those time periods in which the receiver 10 performs its tracking point detection, as well as its envelope slope and skywave/groundwave samplings, in the manner disclosed in U.S. Pat. No. 4,325,067. The muting circuit 30 is controlled in this fashion by a time gate signal which couples over a line 32 from the microprocessor 20.

Figure 3:
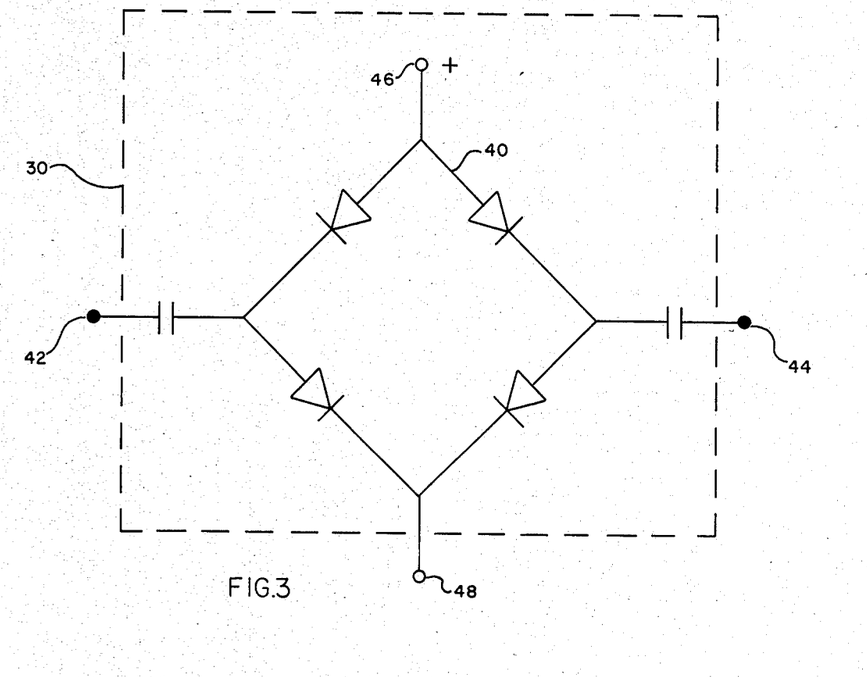
FIG. 3 illustrates further details of the muting circuit shown in FIG. 2.

FIG. 3 illustrates one possible embodiment of the muting circuit 30. The circuit 30 comprises a balanced, four diode bridge circuit 40 having a signal input 42 and a signal output 44. The upper mid-bridge terminal 46 of the bridge circuit 40 is fixed at a positive voltage. The lower mid-bridge terminal 48 of the circuit 40 receives the time gate signal from the microprocessor 20 over the line 32 and serves as the control input of the circuit 40. When the time gate signal that is applied to the control input 48 has a positive value equal to the fixed voltage of the terminal 46, the circuit 40 will attenuate any signal applied to its input 42, resulting in a zero or near zero signal at its output 44. On the other hand, when the time gate signal at the control input 48 has a zero value, the circuit 40 will pass the signal at its input 42 to its output 44 with substantially no attenuation. The circuit 40 thus acts essentially as a received signal switch, the condition of which is controlled by the instantaneous level of the time gate signal that is applied to the control input 48 by the microprocessor 20.

Figure 5A:
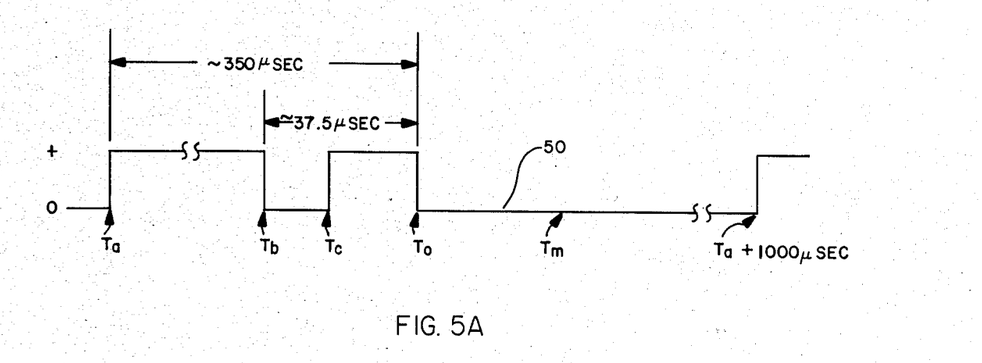
FIGS 5A-5C show time gate signals useful in controlling the operation of the muting circuit of FIGS. 2, 3 and 4.

FIG. 5A illustrates the format of one suitable time gate signal 50 for controlling the operation of the muting circuit 30 of FIGS. 2 and 3. As noted, when the receiver 10 is in its settling or tracking mode, the microprocessor 20 knows the start time $T_o$ of the Loran-C pulse being tracked, as well as the $T_m$ of its tracking point zero crossing, each of which is indicated in FIG. 5A. Time $T_a$ preceeds the Loran-C pulse start time $T_o$ by a period corresponding to pre-pulse sensitivity period for impulse noise, i.e., about 350 microseconds. The time gate signal 50 of FIG. 5A thus goes from a zero level to a plus level at time $T_a$, causing the muting circuit 30 to attenuate the signals received by the receiving antenna 12 of the receiver 10.

The time gate signal 50 remains at the plus level until time $T_b$. Times $T_b$ and $T_c$ define a window during which the receiver 10 performs its skywave/groundwave sampling. As noted, the receiver 10 performs its skywave/groundwave sampling by taking signal samples at 65.0 microseconds, 58.8 microseconds and 52.5 microseconds, respectively, prior to the tracking point time $T_m$, which are about 35.0 microseconds, 28.8 microseconds and 22.5 microseconds, respectively, prior to the pulse start time $T_o$. The times $T_b$ and $T_c$ are selected to define a window which is of sufficient duration to include these sample times. Thus, at time $T_b$, which may be about 37.5 microseconds prior to time $T_o$, the time gate signal 50 of FIG. 5A switches from a plus level to a zero level to cause the muting circuit 30 to pass the signals received at its input 42 and to permit the receiver 10 to perform its skywave/groundwave sampling. At time $T_c$, which may be about 20.0 microseconds prior to time $T_o$, the signal 50 switches back to its plus level, again causing muting circuit 30 to attenuate the signals received by the receiver 10.

At time $T_o$, the time gate signal 50 again returns to its zero level where it remains until the receiver 10 is readied to receive the next succeeding pulse in the Loran-C pulse train being tracked. Since the pulses in the train are precisely spaced from one another by 1000 microseconds, the signal 50 switches back to its plus value at a time $T_a+1000$ microseconds in preparation for receipt of the next pulse. The receiver 10 can thus perform its envelope slope sampling and tracking point detection operations during the time period between $T_o$ and $T_a+1000$ microseconds uninterrupted by the muting circuit 30.

Figure 5B:
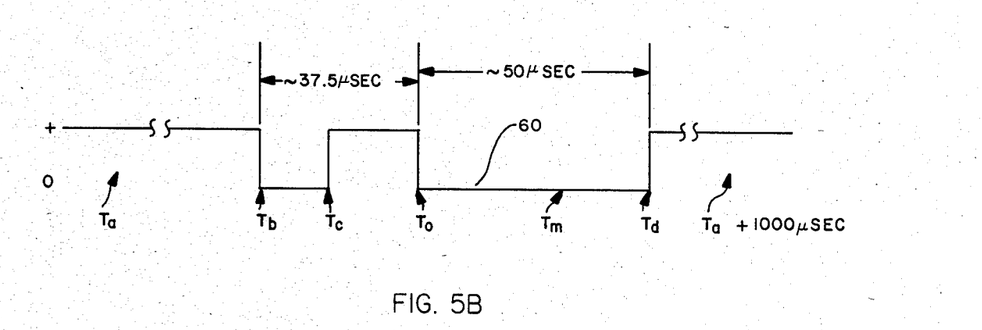

FIG. 5B illustrates the format of a modified time gate signal 60 for controlling the operation of the muting circuit 30 of FIGS. 2 and 3. With the time gate signal 60 applied to the control input 48 of the muting circuit 30, the muting circuit 30 normally will attenuate the signals received by the receiver 10, but will allow them to pass unattenuated during two discrete time periods. The first such time period, which is defined by the time between $T_b$ and $T_c$, permits the receiver 10 to perform its skywave/groundwave sampling, as discussed above. The second such time period, which is defined by the time between $T_o$ and $T_d$, consists of about 50 microseconds, during which the envelope slope sampling and tracking point detection operations are performed.

Figure 4:
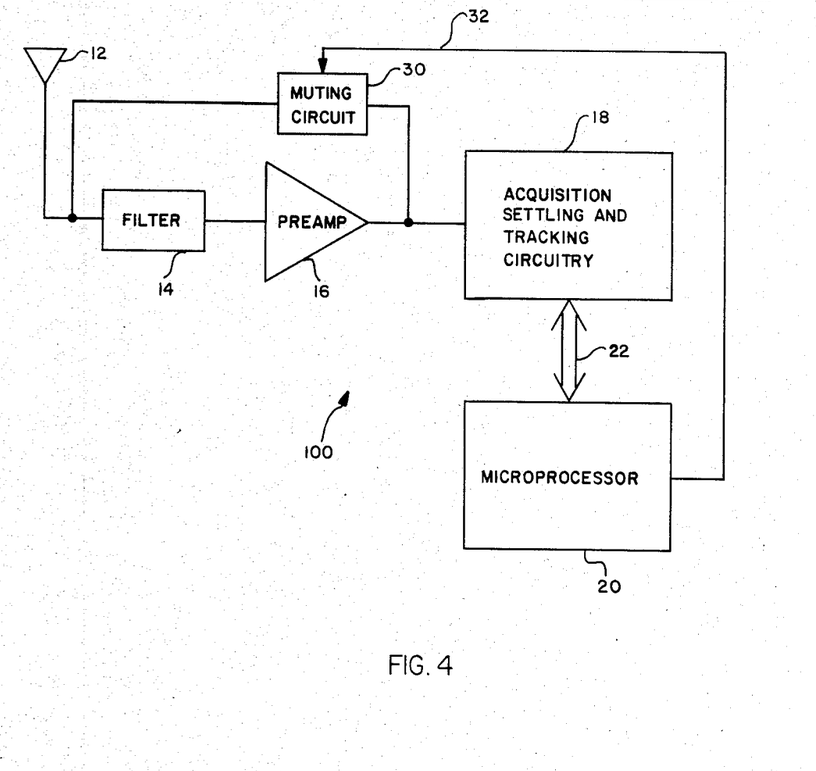
FIG. 4 is a block diagram of a Loran-C receiver which incorporates a muting circuit in accordance with a second, modified embodiment of the invention.

FIG. 4 is a block diagram of a second embodiment of the invention. Shown there is a Loran-C receiver 100 which is substantially identical to the Loran-C receiver 10 of FIG. 2. The components of the receiver 100 which are identical to those of receiver 10 are labeled with identical reference numerals FIG. 4.

As shown in FIG. 4, the muting circuit 30 in the receiver 100 is connected in a feedback loop between the output of the combined filter 14 and preamplifier 16 and its input. The muting circuit 30 is controlled by a time gate signal which is received on the line 32 from the microprocessor 20. During those time periods in which received signal attenuation is desired, the muting circuit 30 is activated to feedback the output of the combined filter 14 and preamplifier 16 to its input. Since the output of the preamplifier 16 is 180° out of phase with this input, the result of this feedback is to cancel the input to the combined filter 14 and preamplifier 16, thereby effectively attenuating the signals received by the receiver 10. During those time periods in which no received signal attenuation is desired, the muting circuit 30 is deactivated to terminate the negative feedback. The operation of the muting circuit 30 in the receiver 100 is thus the inverse of the operation of the muting circuit 30 in the receiver 10. Placing the muting circuit 30 in a feedback loop around the filter 14 and preamplifier 16 in the manner illustrated in FIG. 4 prevents any transients which may be generated during switching of the muting circuit 30 from themselves exciting the front end circuitry of the receiver 100.

Figure 5C:
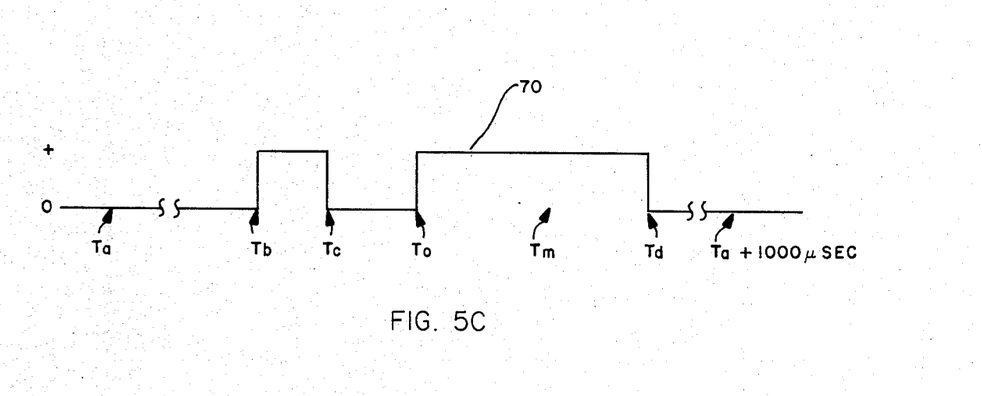

It will be appreciated that the specific muting circuit 30 shown in FIG. 3 may also be used in the embodiment of FIG. 4. However, the time gate signal that is applied to the control input 48 of the circuit 40 should, in the case of FIG. 4, be the inverse of the time gate signals 50 and 60 shown in FIGS. 5A and 5B. One such time gate signal 70 suitable for controlling the operation of the muting circuit 30 in the embodiment of FIG. 4 is shown in FIG. 5C. As is apparent, the signal 70 of FIG. 5C is the inverse of the signal 60 of FIG. 5B.

Since the times $T_o$ and $T_m$ are known to the microprocessor 20 in its settling and tracking modes, the generation of the desired time gate signals shown in FIGS. 5A and 5C is a relatively straightforward task which can be accomplished utilizing the existing capabilities of the microprocessor 20. The muting circuit 30 can thus be implemented in the receivers 10 and 100 at a relatively small additional cost. Yet, the circuit 30 substantially reduces the vulnerability of the receivers 10 and 100 to the effects of impulse noise during their critical settling and tracking modes.

While that which has been described above is at present considered to be the preferred embodiments of the invention, it is illustrative only. Various changes and modifications to the described embodiments will be apparent to those skilled in the art which do not depart from the scope of the invention as defined by the appended claims. For example, while a specific form of muting circuit has been shown in FIG. 3, it will be apparent that any of a variety of other means may be used to mute or attenuate the signals received by the receiver during the desired time periods. Moreover, it will be apparent that the utility of the invention is not limited to Loran-C receivers. There are in fact several other pulsed navigational systems in use with which the invention may be used to advantage, including Loran-A, which is a predecessor system to Loran-C, and Loran-D which is currently utilized by the military forces of the United States. Other systems and apparatus with which the invention may be used will be recognized by those skilled in the art.

I claim:

1. Apparatus for reducing the effects of impulse noise on the operation of a navigation receiver of the type that provides navigation information by receiving signals periodically transmitted by each of a plurality of navigation transmitters and measuring the difference in time of arrival of said signals from pairs of said navigation transmitters, the receiver having filter and amplifier means for filtering/amplifying the appropriate bandwidth of received signals, and acquisition/tracking means and microprocessor means for generating appropriately timed pulse output signals upon receiving the passed signals, and providing the navigation information from the time difference between the generation of said pulse signals, said apparatus comprising:

means associated with the microprocessor means for generating a time gate signal which defines a time period of selected duration that preceeds the time of arrival at said receiver of said periodically transmitted signals, and means in the front end of said receiver responsive to said time gate signal for attenuating signals received by said receiver prior to where the received signals are filtered and amplified during the time periods defined by said time gate signal.

2. The apparatus of claim 1 in which means for filtering and amplifying signals received by said receiver, the output of the filter/preamplifier the output of the filter and amplifier means is inverted in phase relative to the input thereto, and in which said attenuating means comprises means for feeding the phase inverted output of the filter and amplifier means back to its input during the time periods defined by said time gate signal thereby substantially to cancel the input to the filter and amplifier means.

3. The apparatus of claim 1 in which said receiver includes means for sampling signals received thereby at selected time intervals, and in which said microprocessor time gate signal generating means generates a time gate signal which defines a plurality of time periods which do not include the selected time intervals during which said sampling means is operative on the received signals.

4. The apparatus of claim 1 in which said microprocessor means generating time signals generates a two level time gate signal normally having a first level and having a second level during said time period of selected duration, and in which said attenuating means is responsive to the said time gate signal of the second level to attenuate signals received by said receiver and to said time gate signal of the first level to pass signals received by said receiver substantially with no attenuation.

5. The apparatus of claim 1 in which said receiver comprises a Loran navigation receiver acquisition/tracking means which is operative initially in an acquisition mode for roughly locating said periodically transmitted signals, and then operative in a settling and tracking mode after the operation of said acquisition means for locating and tracking a specific portion of said periodically transmitted signals, and in which said microprocessor time gate signal generating means is operative during the settling and tracking mode of said settling and tracking means.

6. The apparatus of claim 5 in which said Loran receiver further includes skywave sampling means operative in the settling and tracking mode of said settling and tracking means for sampling said periodically transmitted signals at selected time intervals prior to the time of arrival of said specific portions of said signals, and in which said microprocessor time gate signal generating means is operative during the settling and tracking mode of said settling and tracking means to generate a time gate signal which defines a plurality of time periods which do not include the selected time intervals during which said skywave sampling means is operative on the received signals.

7. The apparatus of claim 1 in which each of said periodically transmitted signals comprises a pulse train, each of which train includes a plurality of discrete pulses separated in time by a known interpulse interval, and in which said microprocessor time gate signal generating means generates a time gate signal which defines a time period that is less than the known interpulse time interval and that preceeds the time of arrival at said receiver of each of said pulses.

8. The apparatus of claim 1 in which said receiver comprises a Loran-C receiver.

9. A method of reducing the effects of impulse noise on the operation of a navigation receiver of the type that provides navigation information by receiving signals periodically transmitted by each of a plurality of navigation transmitters and measuring the difference in time of arrival of said signals from pairs of said navigation transmitters, the receiver having filter and amplifier means for filtering/amplifying the appropriate bandwidth of received signals, and acquisition/tracking means for providing navigation information from the filtered/amplified signals, said method comprising the steps of:

generating by means of the microprocessor a time gate signal which defines a time period of selected duration that preceeds the time of arrival at said receiver of each of said periodically transmitted signals, and attenuating signals received by said receiver at the front end of said receiver during the time periods defined by said time gate signal.

10. The method of claim 9 in which the output of the filter and amplifier means is inverted in phase relative to the input thereto, and in which said attenuating step comprises the step of feeding the phase inverted output of the filter and amplifier means back to its input during the time periods defined by said time gate signal thereby substantially to cancel the input to the filter and amplifier means.

11. The method of claim 9 in which said receiver includes means for sampling signals received thereby at selected time intervals, and in which said time gate signal generating step comprises the step of generating a time gate signal which defines a plurality of time periods which do not include the selected time intervals during which said sampling means is operative on the received signals.

12. The method of claim 9 in which said time gate signal generating step comprises the step of generating a two level time gate signal normally having a first level and having a second level during said time period of selected duration, and in which said attenuating step comprises the step of attenuating signals received by said receiver during the time in which said time gate signal has the second level, and passing signals received by said receiver substantially with no attenuation during the time in which said time gate signal has the first level.

13. The method of claim 9 in which said receiver comprises a Loran navigation receiver including means operative initially in an acquisition mode for roughly locating said periodically transmitted signals and means operative in a settling and tracking mode after the operation of said acquisition means for locating and tracking a specific portion of said periodically transmitted signals, and in which said time gate signal generating step is operative during the settling and tracking mode of said settling and tracking means.

14. The method of claim 13 in which said Loran receiver further includes skywave sampling means operative during the settling and tracking mode of said settling and tracking means for sampling said periodically transmitted signals at selected time intervals prior to the time of arrival of said specific portions of said signals, and in which said time gate signal generating step is operative during the settling and tracking mode of said settling and tracking means to generate a time gate signal which defines a plurality of time periods which do not include the selected time intervals during which said skywave sampling is performed on the received signals.

15. The method of claim 9 in which each of said periodically transmitted signals comprises a pulse train, each of which train includes a plurality of discrete pulses separated in time by a known interpulse interval, and in which said time gate signal generating step comprises the step of generating a time gate signal which defines a time period that is less than the known interpulse interval and that preceeds the time of arrival at said receiver of each of said pulses.

* * * * *